United States Patent [19]

Moriyama et al.

[11] Patent Number: 4,496,996
[45] Date of Patent: Jan. 29, 1985

[54] RUNNING GUIDE SYSTEM

[75] Inventors: Masakazu Moriyama; Takao Saito, both of Aichi, Japan

[73] Assignee: Toyota Jidosha Kogyo Kabushiki Kaisha, Toyota, Japan

[21] Appl. No.: 368,813

[22] Filed: Apr. 15, 1982

[30] Foreign Application Priority Data

Jun. 15, 1981 [JP] Japan ................................ 56-91966

[51] Int. Cl.$^3$ ............................................. G11B 5/00
[52] U.S. Cl. ................................................... 360/12
[58] Field of Search ..................... 360/12; 369/13, 21; 340/23, 24

[56] References Cited

U.S. PATENT DOCUMENTS

| 3,845,289 | 10/1974 | French | 340/24 |
| 3,899,769 | 8/1975 | Honore et al. | 340/24 |
| 4,190,819 | 2/1980 | Burgyan | 360/12 |
| 4,291,373 | 9/1981 | Mizore et al. | 369/21 |

Primary Examiner—Vincent P. Canney
Attorney, Agent, or Firm—Cushman, Darby & Cushman

[57] ABSTRACT

Maps from a starting point to a destination are automatically, successively renewed and indicated on CRT each time a predetermined distance is covered. The map to be indicated are divided into a plurality of map contents and stored in a memory medium, and further, checkpoints for correcting accumulated errors of the running distance each predetermined distance are stored in the memory medium. Additionally, a notice by voice is given everytime map is renewed, immediately before the renewal.

2 Claims, 4 Drawing Figures

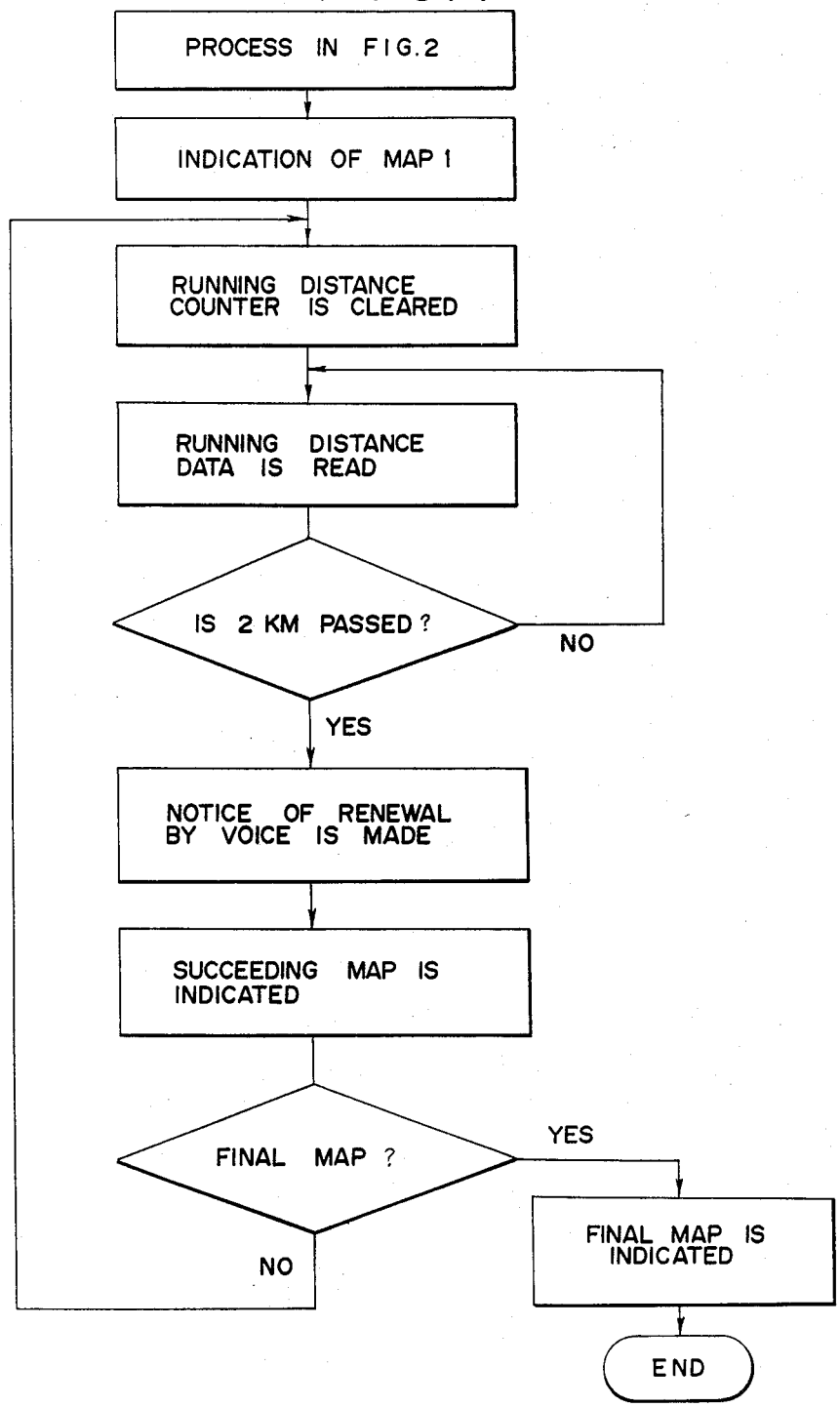

RUNNING GUIDE SYSTEM

BACKGROUND OF THE INVENTION

1. Field of the Invention

The present invention relates to a suitable running guide system for indicating a map required for the running of a vehicle such as a motor car by use of an electronic unit in accordance with a running area.

2. Description of the Prior Art

While running through a district being unfamiliar on a motor car, one can turn only to a map book for help. Then, one driving the vehicle must frequently refer to the map book and look for a necessary new part of the map book as the vehicle continues to run. The works as described above are troublesome, and moreover, the safety driving may be hindered because of looking away from due direction.

SUMMARY OF THE INVENTION

One object of the present invention is to provide a running guide system for automatically, successively indicating a map of a district to be passed through by use of an electric unit.

Another object of the present invention is to provide a running guide system wherein a notice for renewal by voice can be given each time a predetermined running distance is covered.

BRIEF DESCRIPTION OF THE DRAWINGS

FIG. 4 is a flow chart of the map renewal process according to the present invention.

FIG. 1 is a block diagram showing the embodiment of the present invention.

Figure 1:
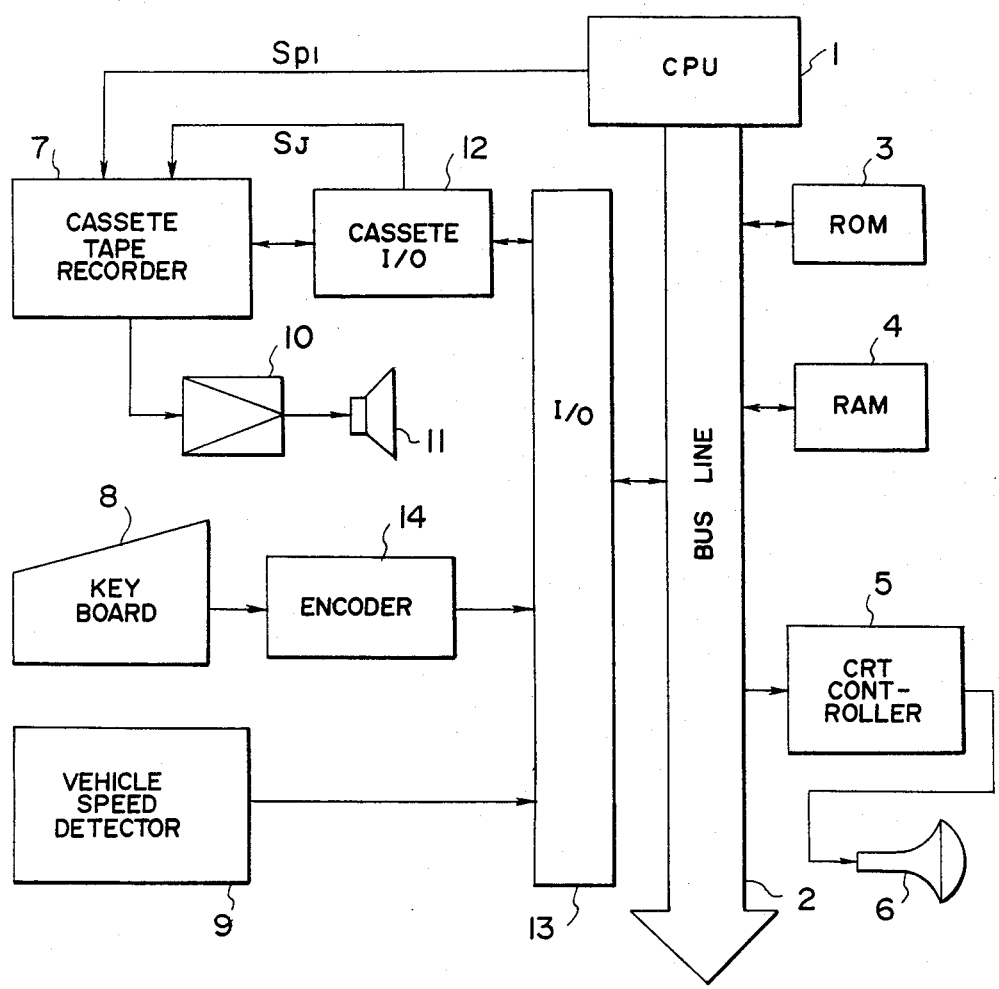
FIG. 1 is a block diagram showing an embodiment of the present invention.

The core of the system is a central process unit (hereinafter referred to as "CPU") 1, to which are connected through a bus line 2 a variety of components essential for constituting a computer including a nonvolatile memory (hereinafter ROM) 3, a volatile memory (RAM) 4, a cathode ray tube (hereinafter CRT) controller 5 and CRT 6. In addition, CRT may be replaced by liquid crystal, a fluorescent indicating tube, plasma, electroluminescence or the like. Additionally, connected to CPU 1 as the external components are a cassette tape recorder 7, a keyboard 8 and a vehicle speed pulse generator 9. The cassette tape recorder may have two to four tracks, among which one track is used for voice. An output signal from this voice track is amplified by an amplifier 10, and then, actuates a speaker 11. Another track from the remaining track or tracks is used for map data recorded in a predetermined format. This cassette tape recorder 7 is connected to an input/output (hereinafter I/O) interface 13 being of a peripheral IC through a cassette interface 12. In the case of Kansas City Standard for example, the cassette interface 12 modulates an output signal from I/O 13 at a transfer speed of 300 baud and demodulates an output signal from the cassette tape recorder 7 (in this case, the output signal is emitted from I/O 13 as a serial signal). The keyboard 8 has keys for specifying various modes and a control key, encodes the content of a key operated in an encoder 14, converts it into an ASCII code for example, and feeds it to I/O 13. Further, the vehicle speed pulse generator 9 generates pulse signals commensurate to the rotation of a tire of the vehicle, and generates the pulse signals only during running of the vehicle. A running distance can be found from the number of the pulse signals fed from this vehicle speed pulse generator 9.

ROM 3 incorporates therein a monitor program, a program for processing the map data, and programs for processing data from the externally connected components, controlling the cassette tape recorder 7 and processing indications. RAM 4 temporarily stores the data recorded in the cassette tape, and comprises a memory losing the stored contents by being reset due to power-off (i.e., ignition switch off) and C-MOS RAM capable of being backed up. Every memory is reset by the ejection of the cassette tape and all of the data are cleared. The CRT controller 5 comprises a bus controller, a character generator, a signal converter, a synchronous signal generator and the like, and contents of indication according to the programs are indicated in CRT 6. In this case, the indication of the map may be made by three to five color patterns, and colors, a contraction scale and the like are determined in accordance with the size of CRT. In the case of using a color CRT of 6 in. as CRT 6 for example, the picture area is 112.5×83.0, and the resolving power of 256×192 dots at the maximum is obtainable. Consequently, this scope is the contents of map which can be indicated in CRT 6.

Figure 2:
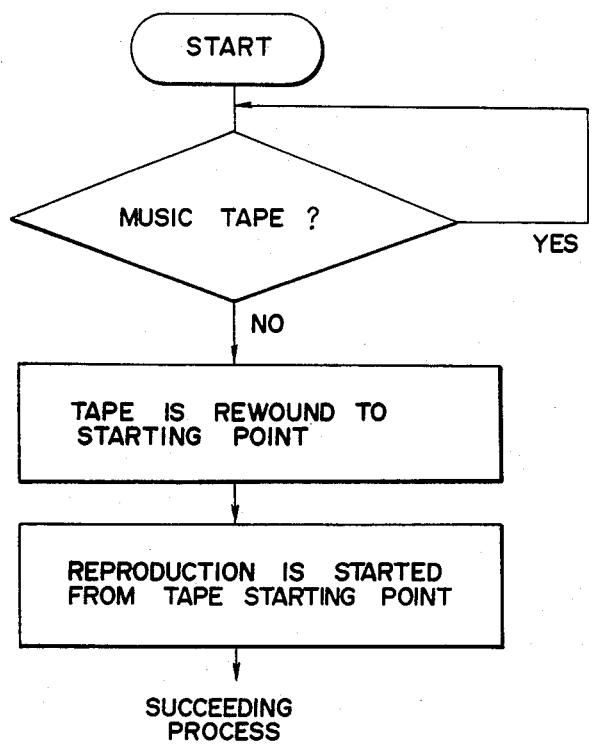
FIG. 2 is a tape setttting program according to the present invention.
Figure 3:
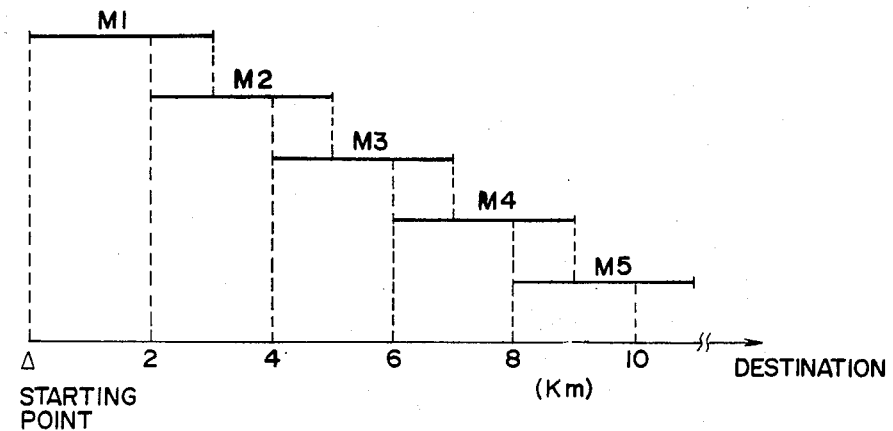
FIG. 3 is a view in explanation of map renewal process according to the present invention.

In the map book from the starting point to the destination, a plurality of maps for continuously indicating a map showing the scope of a running distance of 3 km for example are included, and the contents of the maps are converted into digital signals and recorded in the cassette tape. Now, the cassette tape covering the districts of the scheduled running course is inserted into the cassette tape recorder 7, and then, a play button "PLAY" of the tape recorder is pressed to start the tape. The operation described above brings about the reproduction process. However, sometimes, a music tape may be played by mistake, and hence, it is necessary to judge the type of the tape. Judgement as to whether it is a music tape or not is made based on the fact that the tape, which has recorded the digital signals, is modulated to two types of frequencies, i.e., high and low. In other words, the judgement is made based on whether these frequencies are continuously generated for a predetermined period of time. In the case of the music tape, CPU 1 does not make any further process, and the contents, which have been recorded, are continuously reproduced. Consequently, the operator makes judgement to discontinue it or not. On the other hand, in the case of the map data tape, the tape is forcedly rewound irrespective of what portion the tape reproduction point is present at, and is set at the starting point. Upon completion of setting, reproduction of the aforesaid map data tape is started. The cassette tape recorder 7 obtains a tape judging signal S$_J$ from the cassette interface 12. CPU incorporated in the cassette tape recorder 7 controls rewinding and reproduction based on this tape judging signal S$_J$. The flow chart in FIG. 2 shows the process described above.

In recording the map data on the cassette tape, when each 3 km is indicated in a map sheet, an overlapped section (1 km for example) is provided between respective maps, thus facilitating inspection. In this case, recording of the map data into the cassette tape is made in a sequential order of Map 1 (M1), Map 2 (M2) and Map 3 (M3). Each map has the contents of data of 3 km. Renewal of the maps every 2 km is effected such that CPU 1 calculates the running distance based on the outputs from the vehicle speed detector 9 and the indicated map is renewed when 2 km is passed after the presently indicated map has started indication. In this case, in order to minimize accumulated errors in the running distance, places or objects are selected as the checkpoints once at a rate of 5 or 10 km, and, when a checkpoint is passed, a driver or any other occupant operates a "pass" key to thereby correct the distance. For the respective checkpoints, the distances from an original point predetermined in the map are recorded. These recorded data are compared with the actual running distances by CPU 1. For example, when a checkpoint is selected at a position 6.3 km apart from the starting point on the map, and the actual running distance up to the checkpoint is 6.8 km, an error of 0.5 km is corrected by the operation of the "pass" key, whereby, in the following distance calculation, calculation is performed based on that the checkpoint is 6.3 km apart from the original point.

Automatic renewal of the indicated map is carried out in accordance with the flow chart shown in FIG. 4 (In FIG. 4, correction calculation is omitted). This process is carried out immediately after the completion of the process shown in FIG. 2. Upon indicating Map 1, a running distance counter is cleared, then, distance data is read in from the vehicle speed detector 9, and calulation of distance is effected in accordance with this distance data, whereby determination is made as to whether 2 km is passed or not every predetermined time. If the passage of 2 km is determined, an announcement of "The map is renewed to the next one" by voice is performed. This announcement may be effected by use of voice recognizing means. However, in this case, the aforesaid cassette tape is additionally used for this purpose, because the cassette tape is usable as the data loading. The cassette tape, which has stopped after loading of the map data, is run to produce voice from a speaker 11. CPU 1 gives control instructions to the cassette tape recorder 7 to control the stopping, running and the like of the tape. When the map is not the final map showing the destination after the announcement of the renewal of the map is performed, the contents of the running distance counter for the calculation of distance is cleared, and an output signal from the vehicle speed detector 9 is read in again. In addition, when it is determined that the indicated map is the final map, the indicated map is continued to be indicated to the end.

Announcements by voice are preset in the data in such a manner that the announcements are effected slightly before (500 m, for example) a diverging point, a landmark, a checkpoint and the like. In comparison between the value of distance specified by this value of data and the actual running distance, when both are coincided with each other, the tape is run to perform an announcement.

During running of the vehicle, if the course to be taken is mistakenly selected on the way, the running direction changing point programmed is found to be different from the actual position from some error or other, respective keys "MANUAL", "BACK" and "NEXT" are operated in succession, whereby the picture indicated on CRT 6 can be manually changed. In this case, the respective keys have the following functions.

"MANUAL": The map indicated in CRT 6 is to be held.
"BACK": A map immediately behind of the map indicated at present is to be indicated.
"NEXT": A map immediately ahead of the map indicated at present is to be indicated.

If the place where one actually is at present is known through the operation of change as described above, then the map including the checkpoint closest to the place is indicated, and "PASS" key is pressed when the vehicle passes by the checkpoint, thus enabling to return to the automatic change mode by the running distance.

In the foregoing description, the case where voice is used only for announcements, however, voice may be used for a vocal sight-seeing guidance or replaced by sounds of back ground music and the like. Furthermore, the cassette tape may be replaced by a magnetic disc, a magnetic card, a magnetic bubble memory, EP-ROM, EEP-ROM or the like.

As has been clearly known from the foregoing, according to the present invention, the indicated map may be automatically changed corresponding to the positions on the running course. Further, vocal guidance may be announced as well.

It should be apparent to those skilled in the art that the above-described embodiment represents but one of the many possible specific embodiments of the present invention. Numerous and varied other embodiments can be devised by those skilled in the art without departing from the spirit and scope of the present invention.

What is claimed is:

1. A running guide system for a motor vehicle comprising:
   running distance detecting means for detecting an actual running distance travelled by the motor vehicle;
   memory means for storing a plurality of maps arranged according to a predetermined sequence illustrating a route from a start point to a destination, each of said maps containing a segment of said route and overlapping with a segment of an adjacent map in said sequence;
   display means for displaying each map stored in said memory means;
   changing means, connected to said running distance detecting means, memory means and display means, for changing a map currently displayed by said display means to a next map in said sequence of maps showing a next segment of said route when the actual running distance coincides with a predetermined running distance of the currently displayed map;
   tape recorder means for playing a cassette tape and generating a tape signal for causing the display of a map by said display means;
   judging means, responsive to the tape signal, for judging whether or not the tape signal is indicative of a music tape or a map information tape; and
   rewinding means, responsive to a signal from said judging means, for fully rewinding said cassette tape to a beginning point thereof when an indication of the map information is judged by said judging means.

2. A running guide system for a motor vehicle comprising:

running distance detecting means for detecting an actual running distance travelled by said motor vehicle;

memory means for storing a plurality of maps in a predetermined sequence illustrating a route from a start point to a destination, each of said maps containing a segment of said route and overlapping with a segment of an adjacent map in said sequence;

display means for displaying each said map stored in said memory means;

changing means, connected to said running distance detecting means, memory means and said display means, for changing a map currently displayed on said display means to a next map in said sequence showing the predetermined next segment of said route when the actual running distance coincide with the running distance predetermined for each map;

voice generating means for announcing a notice of renewal of the map currently displayed prior to the actual renewal of the map;

tape recorder means for displaying a cassette tape and generating a tape signal for causing the display of a map by said display means;

judging means, responsive to the tape signal, for judging whether or not the tape signal is indicative of a music tape or a map information tape; and rewinding means, responsive to a signal from said jugding means, for fully rewinding said cassette tape to a beginning point thereof when an indication of the map information is judged by said judging means.

* * * * *